(12) United States Patent
Yang

(10) Patent No.: US 8,292,054 B2
(45) Date of Patent: Oct. 23, 2012

(54) DOUBLE CLUTCH

(75) Inventor: Sangsuk Yang, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 535 days.

(21) Appl. No.: 12/561,053

(22) Filed: Sep. 16, 2009

(65) Prior Publication Data

US 2010/0089715 A1    Apr. 15, 2010

(30) Foreign Application Priority Data

Oct. 14, 2008  (KR) ................ 10-2008-0100421

(51) Int. Cl.
*F16D 27/01* (2006.01)
*F16D 27/12* (2006.01)
(52) U.S. Cl. ............... 192/48.2; 192/84.31; 192/84.7
(58) Field of Classification Search ............ 192/48.2, 192/84.3, 84.31, 84.96
See application file for complete search history.

(56) References Cited

U.S. PATENT DOCUMENTS

| | | | | |
|---|---|---|---|---|
| 2,279,986 A | * | 4/1942 | Griswold | ............ 192/48.2 |
| 5,545,103 A | * | 8/1996 | Gustin | ............ 192/48.2 |
| 5,966,999 A | | 10/1999 | Showalter et al. | |
| 6,668,996 B2 | * | 12/2003 | Nekado et al. | ............ 192/84.91 |
| 6,786,314 B2 | * | 9/2004 | Tomari et al. | ............ 192/48.2 |
| 6,983,835 B2 | | 1/2006 | Schneider et al. | |

FOREIGN PATENT DOCUMENTS

| JP | 55-132422 A | 10/1980 |
|---|---|---|
| JP | 2001-165197 A | 6/2001 |

* cited by examiner

*Primary Examiner* — David D Le
*Assistant Examiner* — Jacob S Scott
(74) *Attorney, Agent, or Firm* — Morgan, Lewis & Bockius LLP

(57) ABSTRACT

A double clutch may include an input shaft, a first output shaft disposed coaxially with the input shaft, a second output shaft enclosing the first output shaft and disposed coaxially with the first output shaft, a first clutch pack disposed between the first output shaft and the input shaft, a second clutch pack disposed between the second output shaft and the input shaft, an electromagnet disposed between the first clutch pack and the second clutch pack, a first permanent magnet and a second permanent magnet disposed such that the same poles of the first and second permanent magnets face the electromagnet at both sides of the electromagnet, a first ball ramp operating to press the first clutch pack, as the first permanent magnet moves toward the electromagnet, and a second ball ramp operating to press the second clutch pack, as the second permanent magnet moves toward the electromagnet.

8 Claims, 3 Drawing Sheets

DOUBLE CLUTCH

CROSS-REFERENCE TO RELATED APPLICATION

The present application claims priority to Korean Application Serial Number 10-2008-0100421, filed on Oct. 14, 2008, the entire contents of which are incorporated herein for all purposes by this reference.

BACKGROUND OF THE INVENTION

1. Field of the Invention

The present invention relates to a double clutch, particularly a technology about a double clutch that can be used for a DCT (Double Clutch Transmission) and equipped in a vehicle.

2. Description of Related Art

A DCT equipped in a vehicle uses a wet type or a dry type for a double clutch therein. The wet type has an advantage of small shift impact in shifting, but requires many sub-parts, such as a valve body and a hydraulic pump for control, whereas the dry type has an advantage of having high efficiency of power transmission without requiring specific sub-parts, but has a difficulty in controlling half clutch when starting a vehicle upward on a slope.

Therefore, it has been required to develop a double clutch that can be precisely controlled while having a simple configuration, and also reduce shift impact and allowing a vehicle to smoothly start upward on a slope.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a double clutch that can be controlled precisely with high response while having a relatively simple configuration, such that when it is applied to a transmission, it is possible to effectively prevent shift impact and relatively easily control half clutch. Therefore, it is possible to stably and smoothly start a vehicle upward on a slope.

In an aspect of the present invention, the double clutch may include an input shaft, a first output shaft, one end portion of which is disposed in the input shaft and aligned coaxially with the input shaft, a second output shaft enclosing an outer circumference of the other end portion of the first output shaft and aligned coaxially with the first output shaft, a first clutch pack disposed between the first output shaft and the input shaft so as to selectively engage the first output shaft and the input shaft, a second clutch pack disposed between the second output shaft and the input shaft so as to selectively engage the second output shaft and the input shaft, an electromagnetic actuator disposed between the first clutch pack and the second clutch pack, a first permanent magnet slidably disposed between the first clutch pack and the electromagnetic actuator and a second permanent magnet slidably disposed between the second clutch pack and the electromagnetic actuator, wherein the same poles of the first and second permanent magnets face the electromagnetic actuator at both sides of the electromagnetic actuator, a first ball ramp operating the first clutch pack to engage the input shaft and the first output shaft as the first permanent magnet is magnetically coupled with the electromagnetic actuator, and a second ball ramp operating the second clutch pack to engage the input shaft and the second output shaft as the second permanent magnet is magnetically coupled with the electromagnetic actuator.

The input shaft may be formed in a cylinder shape, the first output shaft and the second output shaft may be disposed to be rotatable with respect to the input shaft in the input shaft, the first output shaft may extend outside the input shaft, the second output shaft may extend outside the input shaft while enclosing the other end portion of the first output shaft, a pressing body of the first ball ramp may be spline-connected to an outer circumference of the one end portion of the first output shaft which is not enclosed by the second output shaft and selectively press the first clutch pack, and a pressing body of the second ball ramp may be spline-connected to the second output shaft and selectively press the second clutch pack.

The double clutch may further include a driving body of the first ball ramp, wherein the driving body of the first ball ramp is disposed between the first permanent magnet and the electromagnetic actuator and slidably coupled to the first output shaft such that the pressing body of the first ball ramp presses the first clutch pack by a relative movement between the pressing body and the driving body of the first ball ramp while the driving body of the first ball ramp is interlocked to the input shaft by the first permanent magnet, and a driving body of the second ball ramp, wherein the driving body of the second ball ramp is disposed between the second permanent magnet and the electromagnetic actuator and slidably coupled to the second output shaft such that the pressing body of the second ball ramp presses the second clutch pack by a relative movement between the pressing body and the driving body of the second ball ramp while the driving body of the second ball ramp is interlocked to the input shaft by the second permanent magnet.

The electromagnetic actuator may be disposed in the input shaft, a bearing is disposed between the electromagnetic actuator and the first output shaft, and a cover through which the first output shaft and the second output shaft pass is disposed at an end portion of the input shaft.

An inverter that changes a direction of electric current and supplies the electric current to the electromagnetic actuator may be connected to the electromagnetic actuator, and a controller that changes the direction of the electric current supplied to the electromagnetic actuator by controlling the inverter may be connected to the inverter.

According to various aspects of the present invention, it is possible to achieve precise and high-response control while having a relatively simple configuration, such that when the present invention is applied to a transmission, it is possible to effectively prevent shift impact and relatively easily control half clutch. Therefore, it is possible to stably and smoothly start a vehicle upward on a slope.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
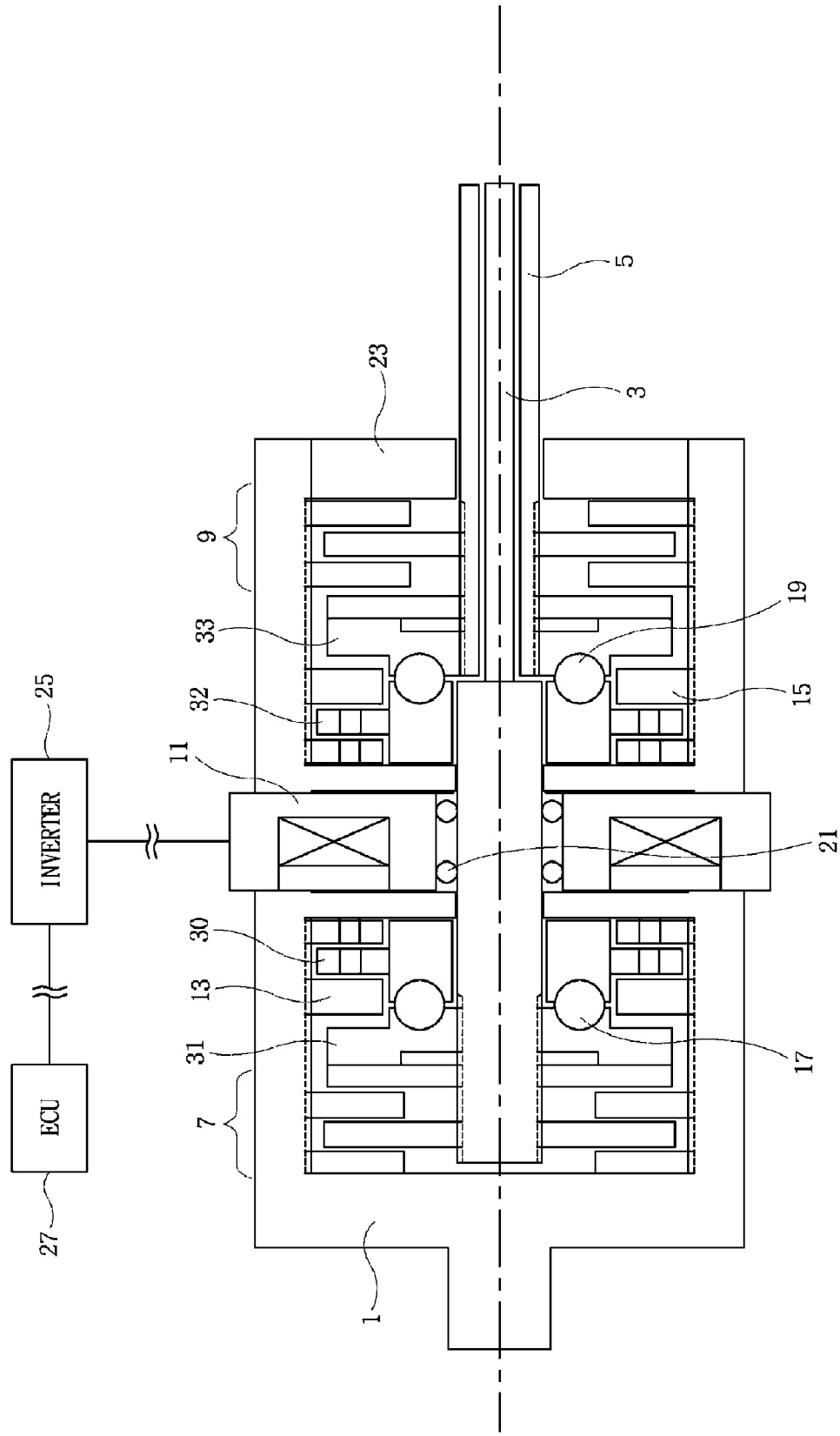
FIG. 1 is a view illustrating the structure of a double clutch according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a double clutch according to an exemplary embodiment of the present invention includes: an input shaft 1; a first output shaft 3 disposed coaxially with input shaft 1; a second output shaft 5 enclosing the outer circumference of a portion of the first output shaft 3 and disposed coaxially with first output shaft 3; a first clutch pack 7 disposed between first output shaft 3 and input shaft 1; a second clutch pack 9 disposed between second output shaft 5 and input shaft 1; an electromagnet 11 disposed between first clutch pack 7 and second clutch pack 9; a first permanent magnet 13 and a second permanent magnet 15 disposed such that the same poles thereof face electromagnet 11 at both sides of electromagnet 11; a first ball ramp 17 operating to press first clutch pack 7, as first permanent magnet 13 moves toward electromagnet 11; and a second ball ramp 19 operating to press second clutch pack 9, as second permanent magnet 15 moves toward electromagnet 11.

Input shaft 1 is formed in a cylinder shape, first output shaft 3 and second output shaft 5 are disposed to be rotatable with respect to input shaft 1 in input shaft 1, second output shaft 5 extends outside input shaft 1 while enclosing a portion of first output shaft 3, a pressing body 31 of first ball ramp 17 is spline-connected to the outer circumference of first output shaft 3 which is not covered by second output shaft 5, and a pressing body 33 of second ball ramp 19 is spline-connected to second output shaft 5.

Similar to common clutch packs, first clutch pack 7 and second clutch pack 9 have a structure in which a plurality of clutch discs spline-connected to input shaft 1 and a plurality of disc plates spline-connected to first output shaft 3 or second output shaft 5, which are alternately disposed.

First ball ramp 17 and second ball ramp 19 include pressing bodies 31 and 33 that are spline-connected with first output shaft 3 and second output shaft 5 and press first clutch pack 7 and second clutch pack 9, respectively, while axially sliding, driving bodies 30 and 32 that move straight the pressing bodies 31 and 33 by movement of balls while being rotated with input shaft 1 by first permanent magnet 13 and second permanent magnet 15 and generating relative rotational displacement from the pressing bodies, and the balls.

As shown in the figures, first permanent magnet 13 and second permanent magnet 15 preferably have a donut-shaped plate structure to be spline-connected to input shaft 1 and axially slide. Further, as can be shown in FIGS. 2 and 3, in an exemplary embodiment of the present invention, first permanent magnet 13 is positioned with the south pole facing electromagnet 11 and second permanent magnet 15 is also positioned with the south pole facing electromagnet 11.

Electromagnet 11 is disposed in input shaft 1, a bearing 21 is disposed between electromagnet 11 and first output shaft 3, a cover 23 through which first output shaft 3 and second output shaft 5 pass is disposed at the end of input shaft 1, such that a package, that is, a structure accommodating the above parts in input shaft 1 is implemented.

An inverter 25 that can change the direction of electric current and supply the electric current is connected to electromagnet 11 and a controller 27 that can change the electric current supply direction by controlling inverter 25 is connected to inverter 25.

Figure 2:
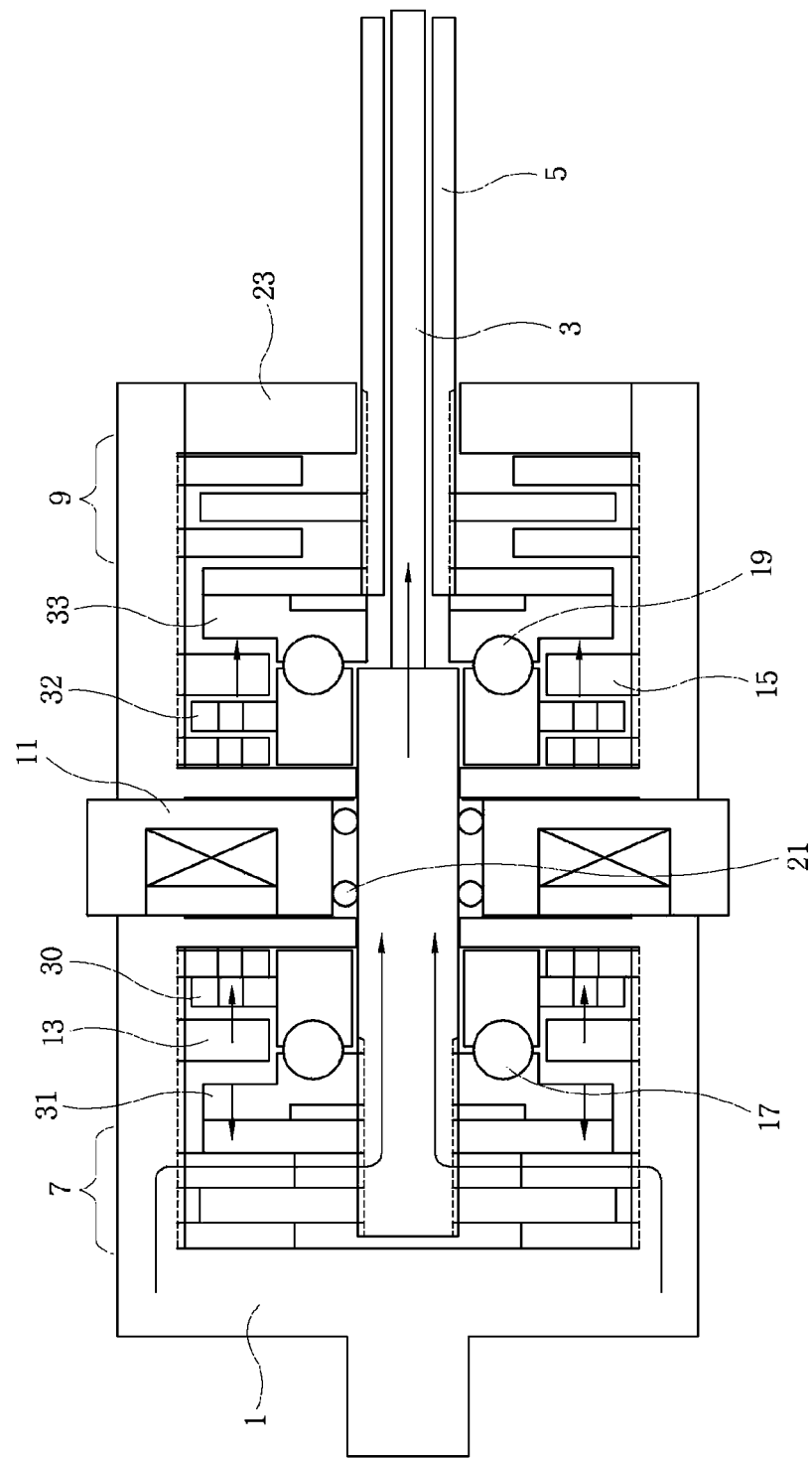
FIG. 2 is a view illustrating the operation when power is outputted to a first output shaft.
Figure 3:
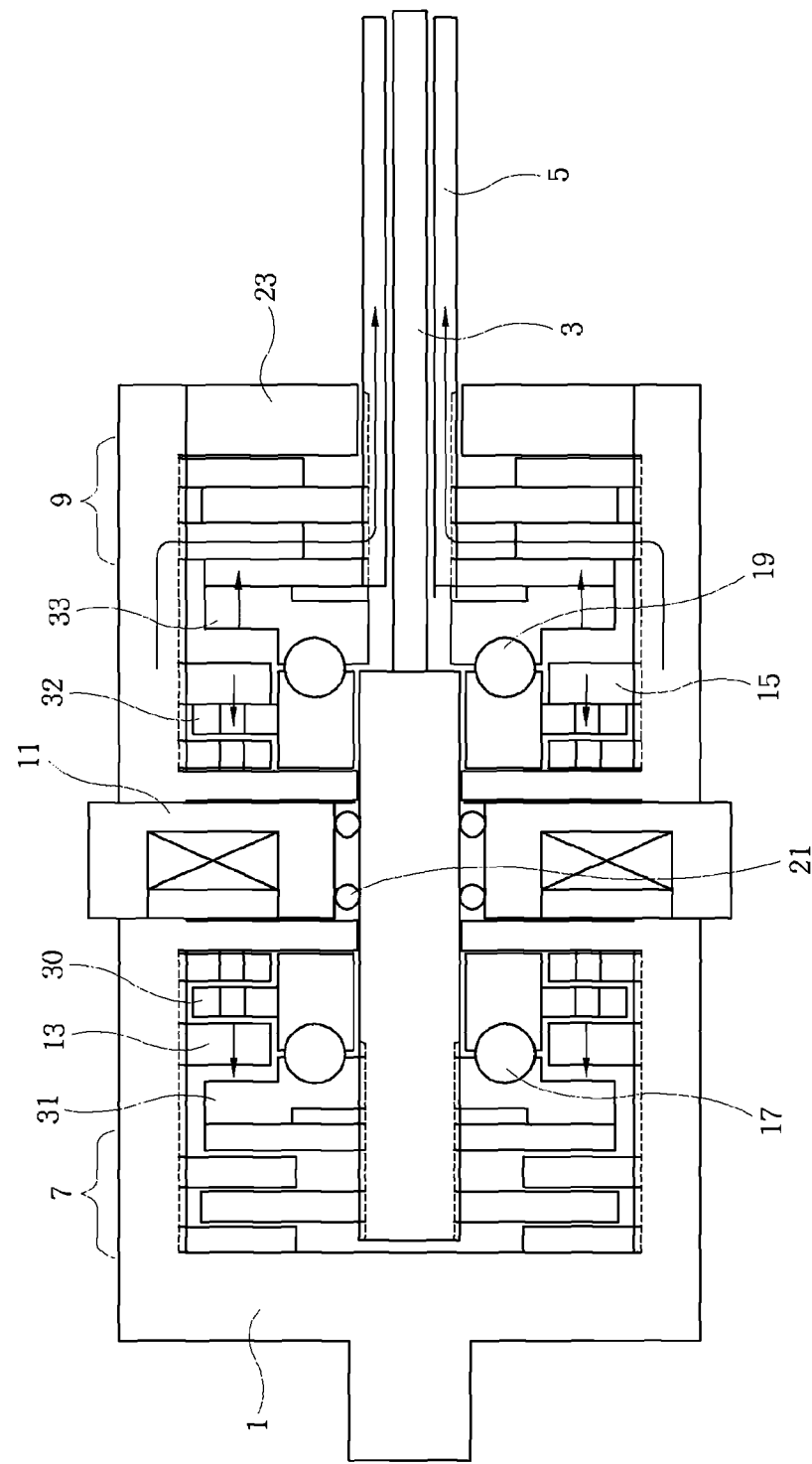
FIG. 3 is a view illustrating the operation when power is outputted to a second output shaft.

FIGS. 2 and 3 are views illustrating the operation of the double clutch having the above configuration according to the invention, in which examples when electric current is supplied to electromagnet 11 in the opposite directions are illustrated. First, FIG. 2 shows an example when the north pole is created at the left side of electromagnet 11 and the south pole is created at the right side.

As electromagnet 11 is magnetized by electric current supplied, first permanent magnet 13 moves toward electromagnet 11, because it has the north pole that is opposite to electromagnet 11.

Since the driving body 30 of first ball ramp 17 is interlocked to input shaft 1 by the movement of first permanent magnet 13, relative rotation with respect to the pressing body 31 spline-connected to first output shaft 3 is generated, such that the pressing body 31 presses first clutch pack 7 by interaction with the balls.

Therefore, power can be transmitted between input shaft 1 and first output shaft 3, such that power is outputted through first output shaft 3.

In this operation, second permanent magnet 15 is pushed by electromagnet 11 and not in contact with the driving body 32 of second ball ramp 19, such that second ball ramp 19 is not operated and power is not outputted through second output shaft 5.

As a result, the power inputted through input shaft 1 is outputted only through first output shaft 3.

FIG. 3 illustrates the opposite operation, in which electric current is supplied to electromagnet 11 in the opposite direction to FIG. 2 by controlling inverter 25 using controller 27, and the south pole is created at the left side of electromagnet 11 and the north pole is created at the right side.

Therefore, as second permanent magnet 15 presses the driving body 32 of second ball ramp 19 while moving toward electromagnet 11 and the driving body 32 is correspondingly interlocked to input shaft 1, relative rotation is generated between the driving body 32 and the pressing body 33, such that the pressing body 33 presses second clutch pack 9 while moving straight.

Therefore, power transmitted through input shaft 1 is outputted through second output shaft 5.

On the contrary, first permanent magnet 13 moves away from electromagnet 11 such that the pressing body 31 of first ball ramp 17 is not interlocked to input shaft 1, such that first clutch pack 7 is not operated and the power of input shaft 1 is not transmitted to first output shaft 3.

In the above operations, it is possible to adjust precisely and quickly the magnitude of the electric current supplied to electromagnet 11 and to ensure precision and quickness when first permanent magnet 13 or second permanent magnet 15 operates first ball ramp 17 or second ball ramp 19. Therefore, it is possible to achieve precise and quick control when outputting power to first output shaft 3 through first clutch pack 7 or to second output shaft 5 through second clutch pack 9.

Accordingly, when a double clutch having the above configuration is used for a vehicle, by connecting input shaft 1 to the engine and connecting first output shaft 3 and second output shaft 5 to the transmission, it is possible to minimize shift impact in shifting and precisely control half clutch with high response, such that it is possible to smoothly and stably start the vehicle upward on a slope.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A double clutch comprising:

an input shaft;

a first output shaft, one end portion of which is disposed in the input shaft and aligned coaxially with the input shaft;

a second output shaft enclosing an outer circumference of the other end portion of the first output shaft and aligned coaxially with the first output shaft;

a first clutch pack disposed between the first output shaft and the input shaft so as to selectively engage the first output shaft and the input shaft;

a second clutch pack disposed between the second output shaft and the input shaft so as to selectively engage the second output shaft and the input shaft;

an electromagnetic actuator disposed between the first clutch pack and the second clutch pack;

a first permanent magnet slidably disposed between the first clutch pack and the electromagnetic actuator and a second permanent magnet slidably disposed between the second clutch pack and the electromagnetic actuator, wherein the same poles of the first and second permanent magnets face the electromagnetic actuator at both sides of the electromagnetic actuator;

a first ball ramp operating the first clutch pack to engage the input shaft and the first output shaft as the first permanent magnet is magnetically coupled with the electromagnetic actuator; and a second ball ramp operating the second clutch pack to engage the input shaft and the second output shaft as the second permanent magnet is magnetically coupled with the electromagnetic actuator.

2. The double clutch as defined in claim 1, wherein the input shaft is formed in a cylinder shape, the first output shaft and the second output shaft are disposed to be rotatable with respect to the input shaft in the input shaft, the first output shaft extends outside the input shaft, the second output shaft extends outside the input shaft while enclosing the other end portion of the first output shaft, a pressing body of the first ball ramp is spline-connected to an outer circumference of the one end portion of the first output shaft which is not enclosed by the second output shaft and selectively presses the first clutch pack, and a pressing body of the second ball ramp is spline-connected to the second output shaft and selectively presses the second clutch pack.

3. The double clutch as defined in claim 2, further comprising:

a driving body of the first ball ramp, wherein the driving body of the first ball ramp is disposed between the first permanent magnet and the electromagnetic actuator and slidably coupled to the first output shaft such that the pressing body of the first ball ramp presses the first clutch pack by a relative movement between the pressing body and the driving body of the first ball ramp while the driving body of the first ball ramp is interlocked to the input shaft by the first permanent magnet; and a driving body of the second ball ramp, wherein the driving body of the second ball ramp is disposed between the second permanent magnet and the electromagnetic actuator and slidably coupled to the second output shaft such that the pressing body of the second ball ramp presses the second clutch pack by a relative movement between the pressing body and the driving body of the second ball ramp while the driving body of the second ball ramp is interlocked to the input shaft by the second permanent magnet.

4. The double clutch as defined in claim 2, wherein the electromagnetic actuator is disposed in the input shaft, a bearing is disposed between the electromagnetic actuator and the first output shaft, and a cover through which the first output shaft and the second output shaft pass is disposed at an end portion of the input shaft.

5. The double clutch as defined in claim 1, wherein an inverter that changes a direction of electric current and supplies the electric current to the electromagnetic actuator is connected to the electromagnetic actuator, and a controller that changes the direction of the electric current supplied to the electromagnetic actuator by controlling the inverter is connected to the inverter.

6. The double clutch as defined in claim 2, wherein an inverter that changes a direction of electric current and supplies the electric current to the electromagnetic actuator is connected to the electromagnetic actuator, and a controller that changes the direction of the electric current supplied to the electromagnetic actuator by controlling the inverter is connected to the inverter.

7. The double clutch as defined in claim 3, wherein an inverter that changes a direction of electric current and supplies the electric current to the electromagnetic actuator is connected to the electromagnetic actuator, and a controller that changes the direction of the electric current supplied to the electromagnetic actuator by controlling the inverter is connected to the inverter.

8. The double clutch as defined in claim 4, wherein an inverter that changes a direction of electric current and supplies the electric current to the electromagnetic actuator is connected to the electromagnetic actuator, and a controller that changes the direction of the electric current supplied to the electromagnetic actuator by controlling the inverter is connected to the inverter.

* * * * *